United States Patent
Körnle et al.

(10) Patent No.: US 12,517,505 B2
(45) Date of Patent: Jan. 6, 2026

(54) LIGHT RING ON A TWO-WIRE SENSOR

(71) Applicant: VEGA GRIESHABER KG, Wolfach (DE)

(72) Inventors: Ralf Körnle, Zell a.H. (DE); Robert Laun, Hausach (DE); Jürgen Haas, Oberwolfach (DE); Thomas Ilg, Haslach (DE); Matthias Harter, Schenkenzell (DE); Fabian Rank, Gutach (DE); Natalie Waldecker, Ortenberg (DE)

(73) Assignee: VEGA Grieshaber KG, Wolfach (DE)

( * ) Notice: Subject to any disclaimer, the term of this patent is extended or adjusted under 35 U.S.C. 154(b) by 430 days.

(21) Appl. No.: 18/014,604

(22) PCT Filed: Jul. 10, 2020

(86) PCT No.: PCT/EP2020/069539
§ 371 (c)(1),
(2) Date: Jan. 5, 2023

(87) PCT Pub. No.: WO2022/008071
PCT Pub. Date: Mar. 13, 2022

(65) Prior Publication Data
US 2024/0045417 A1    Feb. 8, 2024

(51) Int. Cl.
*G05B 23/02* (2006.01)
*G05B 19/048* (2006.01)

(52) U.S. Cl.
CPC ......... *G05B 23/027* (2013.01); *G05B 19/048* (2013.01); *G05B 23/0272* (2013.01);
(Continued)

(58) Field of Classification Search
CPC .............. G05B 23/027; G05B 23/0272; G05B 19/042; G05B 19/048; G05B 2219/24092; G05B 2219/25428
(Continued)

(56) References Cited

U.S. PATENT DOCUMENTS

| | | | |
|---|---|---|---|
| 7,885,610 B2 * | 2/2011 | Isenmann | H04B 17/309 702/140 |
| 10,804,657 B2 * | 10/2020 | Korn | H01R 13/6666 |
| 11,012,116 B2 * | 5/2021 | Schäuble | H04Q 9/00 |

FOREIGN PATENT DOCUMENTS

| | | |
|---|---|---|
| CN | 208404021 U | 1/2019 |
| CN | 110742492 A | 2/2020 |

(Continued)

OTHER PUBLICATIONS

Buttmann et al., EP 1591977 A1, "Method For Signalling Of Alarm Conditions Of A Field Device Used In Automation Technology", Date published: Nov. 2, 2005 (Year: 2005).*
(Continued)

*Primary Examiner* — John H Le
(74) *Attorney, Agent, or Firm* — William Gray Mitchell

(57) ABSTRACT

A two-conductor field device, comprising a measuring transducer for capturing a measurement variable, an electronic unit for processing the measurement data and a two-conductor interface for supplying power to the two-conductor field device and for communicating with a superordinate unit, characterized in that the two-conductor field device has a display unit for signaling a state of the two-conductor field device, which display unit can be visually read remotely.

10 Claims, 3 Drawing Sheets

(52) U.S. Cl.
 CPC .............. *G05B 2219/24092* (2013.01); *G05B 2219/25428* (2013.01)

(58) Field of Classification Search
 USPC ......................................................... 702/185
 See application file for complete search history.

(56) References Cited

FOREIGN PATENT DOCUMENTS

| | | |
|---|---|---|
| DE | 102015122278 A1 | 6/2017 |
| EP | 1591977 A1 | 11/2005 |
| EP | 3502810 A1 | 6/2019 |

OTHER PUBLICATIONS

Monse et al., DE 102015122278 A1, "Functionalized Housing Cover", Date published: Jun. 22, 2017 (Year: 2017).*
International Search Report and Written Opinion for parent application PCT/EP2020/069539 issued on Mar. 20, 2021.
CIPO Office Action for Chinese sibling application 202080102926.5 issued on Apr. 30, 2025.

* cited by examiner

LIGHT RING ON A TWO-WIRE SENSOR

CROSS REFERENCE TO RELATED APPLICATIONS

This patent application claims priority to PCT Patent Application PCT/EP2020/069539, filed on Jul. 10, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a light ring on a two-wire sensor.

Background of the Invention

In process automation technology, field devices are used very often, which are used for detecting and/or influencing process variables. Examples for field devices of this type are fill level measuring devices, limit level measuring devices and pressure measuring devices with sensors, which detect the corresponding process variables fill level, limit level or pressure. Often, such field devices are connected to superordinate units, for example control systems or control units. These superordinate units are used for process control, process visualization and/or process monitoring.

What are known as four-wire field devices are a widely used standard for this. In these four-wire field devices, signal transmission takes place between field device and superordinate units via a first pair of connecting cables according to the known 4 mA to 20 mA standard. In addition to the analogue transmission of signals, there is the possibility that the measuring devices transmit further information to the superordinate unit or receive further information from the same according to various other protocols, particularly digital protocols. The HART protocol or the Profibus PA protocol are mentioned by way of example for that. Furthermore, the supply and digital communication can take place according to the Ethernet-based two wire standard APL (Advanced Physical Layer), which is currently a work in progress.

The energy supply of these field devices takes place via a second pair of connecting cables, so that in total four connecting cables are necessary for signal and energy transmission. These four connecting cables are eponymous for the four-wire field devices.

What are known as two-wire field devices are also known from the prior art.

In two-wire field devices, both the signal transmission between field device and superordinate unit and the energy supply of the field device takes place via the 4 mA to 20 mA power signal, so that no additional supply cable in addition to the two-wire cable is necessary. In order to keep the wiring and installation outlay and the safety measures, for example in the case of use in explosion-protected areas, as small as possible, it is also not desirable to provide additional power supply cables.

In two-wire field devices, the available power input is limited considerably. The electronics in the field device must be designed such that they also operate reliably at a minimum signal current of 4 mA.

Increasingly, remote readability is requested more and more often for field devices, which by means of simple light signals, comparable to a traffic light, signals a state of the field device or exceeding or falling below a previously determined measurement or limit value, as in this manner, first information about the state of the field device can be made available without having to be on site at the field device or building a wireless connection to the same. However, in the case of two-wire field devices, this has hitherto not been possible owing to the limited available energy.

This is perceived as a disadvantage in the prior art.

This is where the present invention proceeds.

It is the object of the invention to develop a field device from the prior art in such a manner that it does not have the above-described disadvantages. This object is achieved by a two-wire field device with the features of as described herein.

BRIEF SUMMARY OF THE INVENTION

In a preferred embodiment, a two-wire field device (100) having a measuring transducer (3) for detecting a measured variable, an electronic unit (5) for processing the measurement data, a two-wire interface (7) for energy supply of the two-wire field device (100) and for communication with a superordinate unit, characterized in that the two-wire field device (100) has a visually remotely readable indicator unit (9) for signaling a state of the two-wire field device (100).

In another preferred embodiment, the two-wire field device (100) as described herein, characterized in that the indicator unit (9) is constructed as an RGB lamp, preferably an RGB light-emitting diode.

In another preferred embodiment, the two-wire field device (100) as described herein, in that the indicator unit (9) is designed and actuated in such a manner that to signal the state, a multiplicity of colours, preferably at least 3 different colours, further preferably at least 16 different colours, further preferably at least 256 different colours can be generated.

In another preferred embodiment, the two-wire field device (100) as described herein, characterized in that the indicator unit (9) is designed and actuated in such a manner that signaling the state of the field device additionally or alternatively takes place by flashing of the indicator unit (9) with different frequencies and/or sequences.

In another preferred embodiment, the two-wire field device (100) as described herein, characterized in that the colours for signaling different states are freely definable and/or assignable.

In another preferred embodiment, the two-wire field device (100) as described herein, characterized in that the indicator unit (9) is coupled with a light ring (11).

In another preferred embodiment, the two-wire field device (100) as described herein, characterized in that the light ring (11) is constructed as part of a lid (14) or housing (13) of the two-wire field device.

In another preferred embodiment, the two-wire field device (100) as described herein, characterized in that the indicator unit (9) is coupled with a luminous band (12).

In another preferred embodiment, the two-wire field device (100) as described herein, characterized in that the luminous band (12) is arranged on the field device.

In another preferred embodiment, the two-wire field device (100) as described herein, characterized in that the measuring transducer (3) is constructed as a radiometric sensor, radar sensor, vibration sensor or pressure sensor.

DETAILED DESCRIPTION OF THE INVENTION

Figure 1:
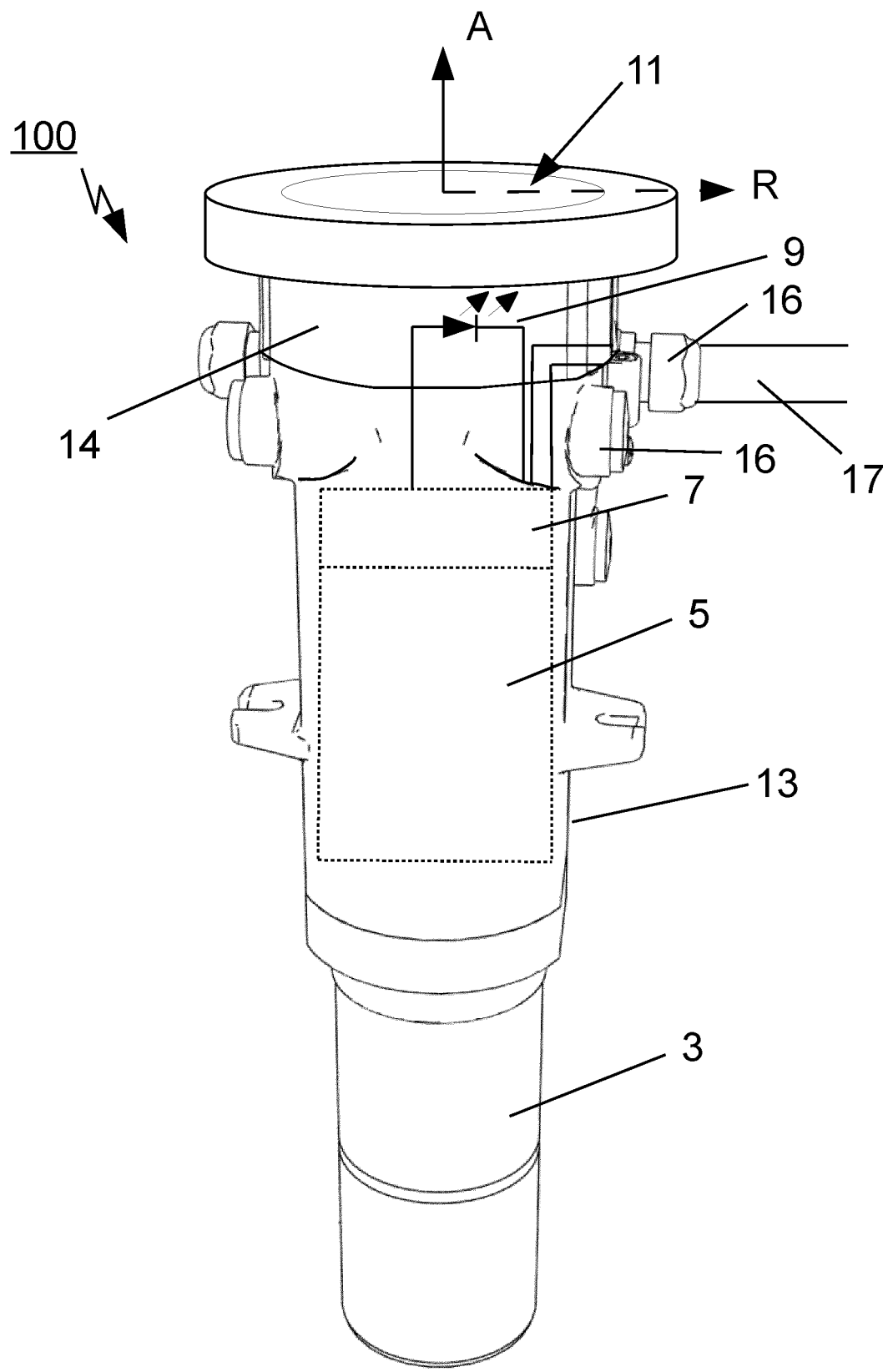
FIG. 1 is a line drawing evidencing a first exemplary embodiment of a two-wire field device according to the present application.

A two-wire field device according to the invention having a measuring transducer for detecting a measured variable, an electronic unit for processing measurement data of the measuring transducer and a two-wire interface for energy supply of the two-wire field device and for communication with a superordinate unit is characterized in that the two-wire field device has a visually remotely readable indicator unit for signaling a state of the two-wire field device.

According to the invention, the entire two-wire field device including the visually remotely readable indicator unit is supplied with energy completely via the two-wire cable and the 4 mA to 20 mA current loop realized therewith.

A visually remotely readable indicator unit according to the present application is present if remote readability from a distance of at least 1 m is present. This may be achieved for example in that an optical display with an area of at least 10 cm$^2$ and a luminous flux of at least 10 lumens takes place.

The state of a field device according to the present application comprises not only state notifications (warning, error, etc.) in the actual sense, but rather may also comprise information about measured values, such as density, fill level or limit level. Thus, for example, the density or the fill level of a medium can be signalled by a colour gradient or the reaching of a limit level can be signalled by di splaying a colour.

Two-wire field devices for example have a considerably reduced outlay for installation and wiring compared to four-wire field devices. In the case of two-wire field devices, the additional installation and wiring of a supply voltage is dispensed with completely, as these take place by means of the two-wire cable, as presented above. This offers considerable advantages in particular in applications, in which regulations for explosion protection are to be taken into account, as the separate cables for the supply voltage and the additional components required therefor are to be taken into account even during planning.

Two-wire field devices can further be designed in an intrinsically safe manner and therefore have an expanded field of application in explosion-protected areas (areas with a potentially explosive atmosphere). Maintenance operations on field devices in areas with a potentially explosive atmosphere are considerably simpler and safer in two-wire field devices than for example in four-wire field devices, as they can also take place safely during continuous measurement operation. By contrast, in four-wire field devices the power supply must first be interrupted and secured against being switched on again. This generally takes place in the terminal compartments, which are very often located at a great distance from the measuring point.

In one embodiment of the two-wire field device, the indicator unit is constructed as an RGB lamp, preferably an RGB light-emitting diode.

In an advantageous development, the indicator unit is designed and actuated in such a manner that to signal the state, a multiplicity of colours, preferably at least three different colours, further preferably at least 16 different colours, further preferably at least 256 different colours can be generated.

It may in particular be advantageous in this case, if the indicator and/or control module has at least three colours for signaling a status of the field device and a fourth colour for signaling a successfully established wireless connection. This can easily be realized by means of an RGB lamp.

Usually, information about e.g. a supply of the device, a device failure, a device status or binary switching states is output by field devices according to the NAMUR recommendations NE 044 "Standardization of Status Indicators on PCT Instruments with the Help of Light Emitting Diodes" (Version Mar. 2, 2003) and NE 107 "Self-Monitoring and Diagnosis of Field Devices" (Version by means of red, yellow and green light signals, the same can be displayed in a remotely readable manner in the present case.

By providing at least one optional further colour for the remotely readable indicator, the status of a wireless connection can for example additionally be displayed. For example, successful establishment of a wireless connection can be signaled by blue signaling. This may be advantageous if a plurality of field devices with a wireless module are arranged in an area. By the signaling, it is possible to ensure that the wireless connection to the correct field device had been produced.

"NAMUR—User Association of Automation Technology in Process Industries" is a representative body of users of measurement and control technology in the chemical industry, whose goal inter alia is the definition of minimum requirements for devices and systems. In this context, NAMUR issues what is known as a recommendation, in which corresponding minimum requirements are defined.

The indicator unit can further be designed and actuated in such a manner that signaling the state of the field device additionally or alternatively takes place by flashing of the indicator unit with different frequencies and/or sequences.

By means of flashing logic with different frequencies and/or sequences for one of the available colours, further information can be provided in a remotely readable manner in addition to the colour gradations discernible with the human eye.

A two-wire field device, which can be optimally adapted to user requirements with regards to remote readability, can be achieved in that the colours for signaling different states are freely definable and/or assignable. This means that the user, for example during commissioning of the two-wire field device, can determine which colours are output for which event. This free configurability can however be restricted for example by the above-mentioned NAMUR colour coding. That is to say that it may be provided that the colours predetermined and fixed on the part of NAMUR must not be used for signaling other events and/or states.

In order to achieve an enlarged radiating surface and signaling in more than one direction, it may be advantageous if the indicator unit is coupled with a light ring.

By means of a light ring, radiation to ensure the remote readability in the radial direction of the light ring may amount to 360°. In addition, the light ring can also radiate in the axial direction.

Preferably, the optical display takes place at least in two spatial directions, preferably in the axial direction and radial direction of the light ring, which can be constructed for example as a hollow cylinder, ball ring or torus.

A particularly simple design can be achieved if the light ring is constructed as part of a lid or housing of the two-wire field device. For example, the lid of the two-wire field device can be manufactured from a light-conducting material and thus overall as part of indicator unit.

Additionally or alternatively, the indicator unit can be coupled with a luminous band. A luminous band in this sense is a long device for light conduction and output. A luminous band in this sense can for example be arranged on the field device. For example, the luminous band can be arranged along a longitudinal extent of the field device and advantageously integrated into a housing or outer skin of the field device.

The measuring transducer of the field device can for example be constructed as a radiometric sensor, radar sensor, vibration sensor or pressure sensor.

Advantageous configurations and variants of the invention emerge from the dependent claims and the following description. The features detailed individually in the dependent claims can be combined in any desired, technically sensible manner with one another and also with the features explained in more detail in the following description, and represent other advantageous design variants of the invention.

DETAILED DESCRIPTION OF THE FIGURES

FIG. 1 shows a first exemplary embodiment of a two-wire field device 100 according to the present application.

In the present exemplary embodiment, the two-wire field device 100 is constructed as a radiometric measuring device for detecting radioactive radiation and has a measuring transducer 3, which in the present exemplary embodiment is constructed as a scintillation counter. The scintillation counter is coupled with an electronic unit 5, which carries out an evaluation and preparation of the measurement data provided by the measuring transducer 3 and provides the same on the output side via a two-wire interface 7.

The two-wire field device 100 is connected by means of the two-wire interface 7 via a two-wire cable 17 to a superordinate unit, for example a control room. The two-wire field device 100 is supplied with energy completely via the two-wire cable 17 and a current loop constructed by means of the same, and transmits the measured values according to the known 4 mA to 20 mA standard and optionally additionally according to a digital standard, for example according to the HART protocol.

A light ring 11 is arranged on the lid 14 at an end facing away from the housing 13, which is coupled with an indicator unit 9 constructed as an RGB light-emitting diode. In this context, coupled means that light generated by the indicator unit 9 is optically coupled into the light ring 11.

The electronic unit 5 with the two-wire interface 7 is accommodated in a housing 13 of the two-wire field device 100. The housing 13 is constructed to be substantially hollow cylindrical and has one or more cable bushings 16, through one of which the two-wire cable 17 is guided to the outside. At one end, the measuring transducer 3 is arranged on the housing 13, at the other end, the housing 13 is closed by a lid 14.

The light ring 11 in this case is configured in such a manner that light coupled into the light ring 11 by the indicator unit 9 is conducted and scattered in such a manner that the entire lamp helps to radiate the light that is coupled in, uniformly at least in the radial direction.

The present two-wire field device 100 is supplied with energy completely from the current loop formed by means of the two-wire cable 17 and has no additional internal or external energy sources.

Figure 2:
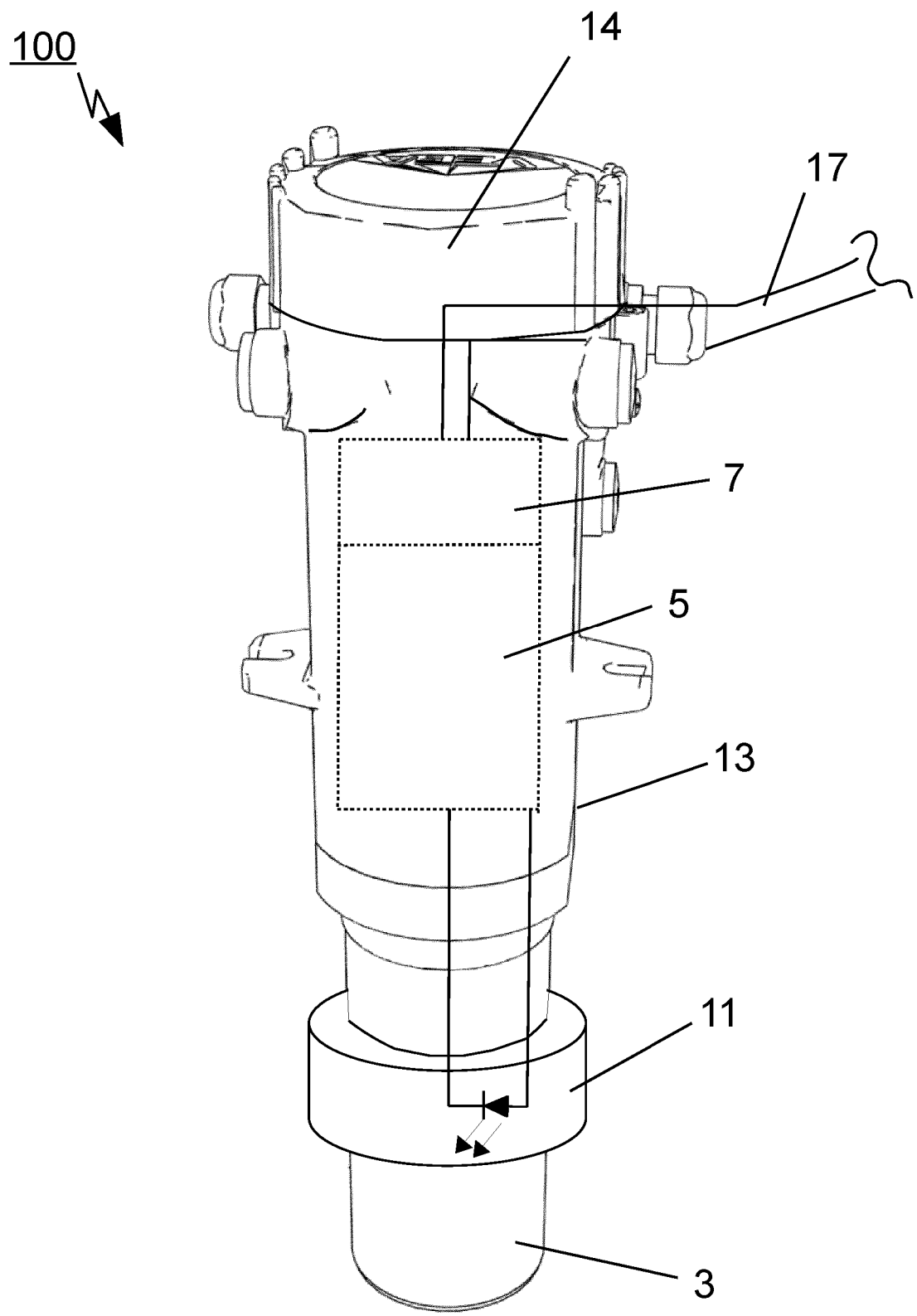
FIG. 2 is a line drawing evidencing a second exemplary embodiment of a two-wire field device according to the present application.

FIG. 2 shows a second exemplary embodiment of a two-wire field device 100 according to the present application.

The two-wire field device 100 according to FIG. 2 corresponds in terms of its fundamental construction to that of the two-wire field device 100 according to FIG. 1 and differs merely due to a different arrangement of the light ring 11 and the different configuration of the lid 14 resulting therefrom.

In contrast to the exemplary embodiment illustrated in FIG. 1, in the present embodiment, the light ring 11 is arranged on a side of the housing 13 facing the measuring transducer 3 and accordingly the lid 14 is in the original state.

Figure 3:
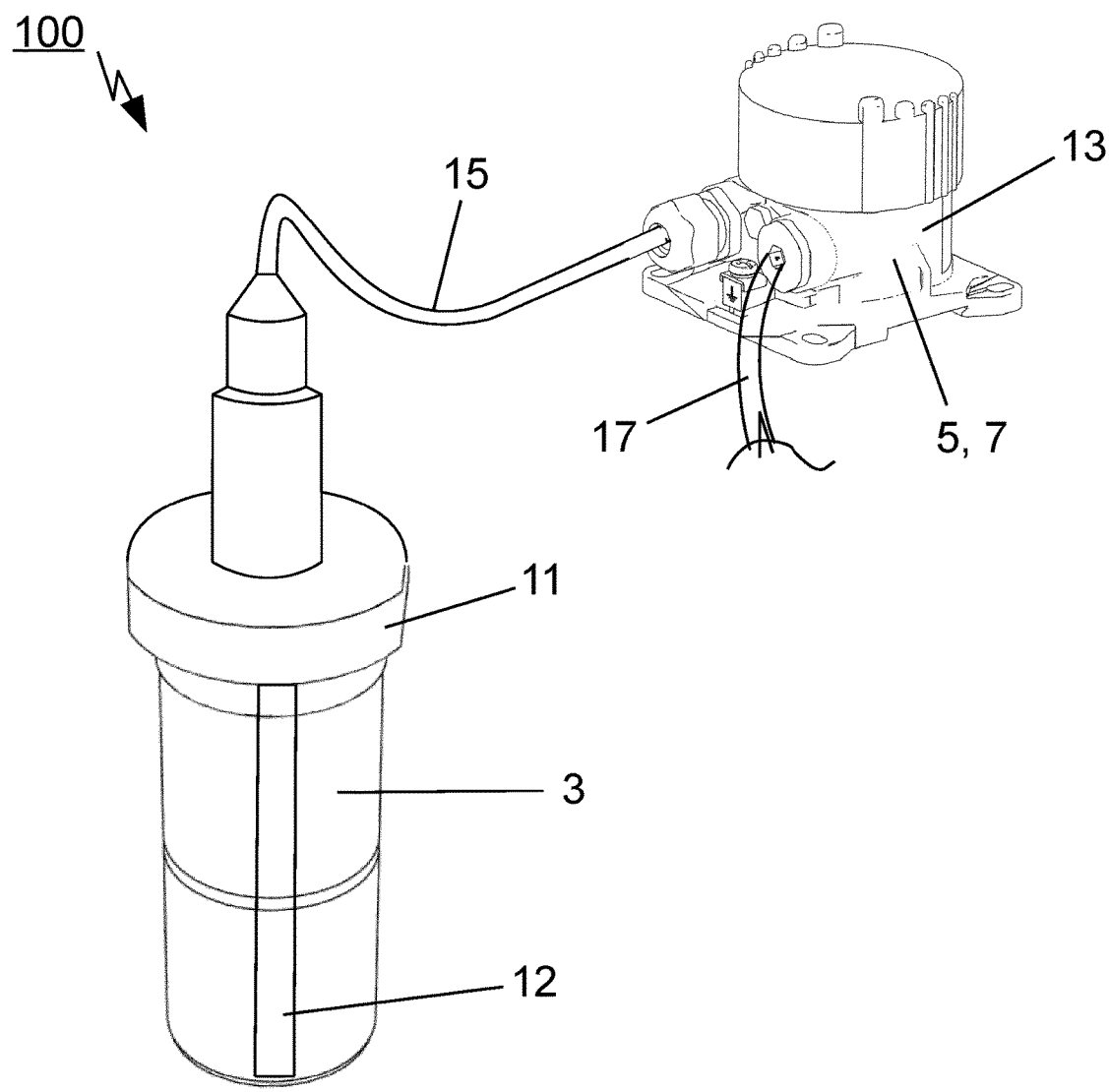
FIG. 3 is a line drawing evidencing a third exemplary embodiment of a two-wire field device according to the present application.

FIG. 3 shows a further exemplary embodiment of a two-wire field device 100 according to the present application.

In the two-wire field device 100 illustrated in FIG. 3, the measuring transducer 3 is constructed to be detached from the housing 13, in which the electronic unit 5 with the two-wire interface 7 is arranged. In the present exemplary embodiment, the measuring transducer 3 is therefore connected to the electronic unit 5 in the housing 13 via a connecting cable 15. The light ring 11 is further arranged on the measuring transducer 3, which light ring is optically coupled with an indicator unit 9, which is supplied via the connecting cable 15 and is constructed as a light-emitting diode. The two-wire interface 7 is for its part connected via the two-wire cable 17 to the superordinate unit, so that the two-wire field device 100 is supplied with energy completely via the two-wire cable 17.

Alternatively, the light ring 11 can also be arranged on the detached part of the housing 13.

In the present exemplary embodiment, the light ring 11 is further expanded by a luminous band 12, which extends along a longitudinal axis of the pressure measuring transducer 3 onto a lateral surface of the measuring transducer in the axial direction.

LIST OF REFERENCE NUMBERS

3 Measuring transducer
5 Electronic unit
7 Two-wire interface
9 Indicator unit
11 Light ring
12 Luminous band
13 Housing
14 Lid
15 Connecting cable
17 Two-wire cable
100 Two-wire field device Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A two-wire field device comprising a measuring transducer for detecting a measured variable, an electronic unit for processing the measurement data, a two-wire interface for energy supply of the two-wire field device and for communication with a superordinate unit, wherein the two-wire field device has a visually remotely readable indicator unit for signaling a state of the two-wire field device, which is remote readable from a distance of at least 1 m, wherein the indicator unit is coupled with a light ring and by means of the light ring, radiation to ensure the remote readability in the radial direction of the light ring amounts to 360 degrees, wherein the entire two-wire field device including the visually remotely readable indicator unit is supplied with energy completely via the two-wire cable and the 4 mA to 20 mA current loop realized therein and the state of the field device comprises information about measured values.

2. The two-wire field device according to claim 1, wherein the indicator unit is constructed as an RGB lamp.

3. The two-wire field device according to claim 2, wherein the indicator unit is designed and actuated in such a manner that to signal the state, a multiplicity of colours can be generated.

4. The two-wire field device according to claim 1, wherein the indicator unit is designed and actuated in such a manner that signaling the state of the field device additionally or alternatively takes place by flashing of the indicator unit with different frequencies and/or sequences.

5. The two-wire field device according to claim 1, wherein colours for signaling different states are freely definable and/or assignable.

6. The two-wire field device according to claim 1, wherein the indicator unit is coupled with a light ring.

7. The two-wire field device according to claim 6, wherein the light ring is constructed as part of a lid or housing of the two-wire field device.

8. The two-wire field device according to claim 1, wherein the indicator unit is coupled with a luminous band.

9. The two-wire field device according to claim 8, wherein the luminous band is arranged on the field device.

10. The two-wire field device according to claim 1, wherein the measuring transducer is constructed as a radiometric sensor, radar sensor, vibration sensor or pressure sensor.

* * * * *